US010142844B2

(12) United States Patent
Xu et al.

(10) Patent No.: US 10,142,844 B2
(45) Date of Patent: Nov. 27, 2018

(54) METHOD AND APPARATUS FOR AUTHORIZING PEDESTRIAN USER EQUIPMENT IN WIRELESS COMMUNICATION SYSTEM

(71) Applicant: LG ELECTRONICS INC., Seoul (KR)

(72) Inventors: Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/467,856

(22) Filed: Mar. 23, 2017

(65) Prior Publication Data

US 2017/0280325 A1 Sep. 28, 2017

Related U.S. Application Data

(60) Provisional application No. 62/313,702, filed on Mar. 25, 2016.

(51) Int. Cl.
*H04W 12/08* (2009.01)
*H04B 1/3822* (2015.01)
*H04W 4/40* (2018.01)

(52) U.S. Cl.
CPC .......... *H04W 12/08* (2013.01); *H04B 1/3822* (2013.01); *H04W 4/40* (2018.02)

(58) Field of Classification Search
CPC .... H04L 67/12; H04W 76/023; H04W 76/14; H04W 12/06; H04W 12/08; H04W 48/02
See application file for complete search history.

(56) References Cited

U.S. PATENT DOCUMENTS

| 8,761,766 B2* | 6/2014 | Cho ...................... G08G 1/0104 |
| | | 455/435.1 |
| 9,604,639 B2* | 3/2017 | Laur ................. B60W 30/0953 |
| 2010/0112978 A1* | 5/2010 | Cho ...................... G08G 1/0104 |
| | | 455/410 |
| 2011/0090093 A1* | 4/2011 | Grimm .................. G01S 5/0072 |
| | | 340/901 |
| 2015/0035685 A1* | 2/2015 | Strickland .............. B60Q 9/008 |
| | | 340/901 |
| 2015/0091740 A1* | 4/2015 | Bai ........................ G08B 21/06 |
| | | 340/901 |
| 2015/0251599 A1* | 9/2015 | Koravadi ............... B60Q 9/008 |
| | | 340/903 |
| 2015/0304817 A1* | 10/2015 | Yorifuji ................... H04M 1/67 |
| | | 455/456.1 |
| 2016/0219029 A1* | 7/2016 | Oshida ................ H04L 67/1095 |

(Continued)

FOREIGN PATENT DOCUMENTS

WO WO 2017052683 A1 * 3/2017 ............. H04L 67/16

*Primary Examiner* — Dung Hong
(74) *Attorney, Agent, or Firm* — Lee Hong Degerman Kang Waimey

(57) ABSTRACT

For vehicle-to-everything (V2X) communication, an eNodeB (eNB) receives authorization information for a pedestrian UE which indicates whether a user equipment (UE) is authorized as the pedestrian UE. Upon receiving the authorization information for the pedestrian UE, the eNB may authorize the UE as the pedestrian UE or not according to the received authorization information, and decide a resource allocation mode for the authorized pedestrian UE.

12 Claims, 13 Drawing Sheets

(56) References Cited

U.S. PATENT DOCUMENTS

| | | | |
|---|---|---|---|
| 2016/0255554 A1* | 9/2016 | Ke | H04W 76/14 |
| | | | 455/436 |
| 2016/0295624 A1* | 10/2016 | Novlan | H04W 76/14 |
| 2017/0079059 A1* | 3/2017 | Li | H04W 16/02 |
| 2017/0339566 A1* | 11/2017 | Yasuda | H04W 12/08 |
| 2018/0049088 A1* | 2/2018 | Shiga | H04W 36/08 |
| 2018/0049104 A1* | 2/2018 | Van Phan | H04W 76/14 |

\* cited by examiner

METHOD AND APPARATUS FOR AUTHORIZING PEDESTRIAN USER EQUIPMENT IN WIRELESS COMMUNICATION SYSTEM

CROSS-REFERENCE TO RELATED APPLICATION

Pursuant to 35 U.S.C. § 119(e), this application claims the benefit of U.S. Provisional Patent Application No. 62/313,702, filed on Mar. 25, 2016, the contents of which are hereby incorporated by reference herein in its entirety.

BACKGROUND OF THE INVENTION

Field of the Invention

The present invention relates to wireless communications, and more particularly, to a method and apparatus for authorizing a pedestrian user equipment (UE) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The pace of LTE network deployment is accelerating all over the world, which enables more and more advanced services and Internet applications making use of the inherent benefits of LTE, such as higher data rate, lower latency and enhanced coverage. Widely deployed LTE-based network provides the opportunity for the vehicle industry to realize the concept of 'connected cars'. By providing a vehicle with an access to the LTE network, a vehicle can be connected to the Internet and other vehicles so that a broad range of existing or new services can be envisaged. Vehicle manufacturers and cellular network operators show strong interests in vehicle wireless communications for proximity safety services as well as commercial applications. LTE-based vehicle-to-everything (V2X) study is urgently desired from market requirement, and the market for vehicle-to-vehicle (V2V) communication in particular is time sensitive. There are many research projects and field tests of connected vehicles in some countries or regions, such as US/Europe/Japan/Korea.

V2X includes a vehicle-to-vehicle (V2V), covering LTE-based communication between vehicles, vehicle-to-pedestrian (V2P), covering LTE-based communication between a vehicle and a device carried by an individual (e.g. handheld terminal carried by a pedestrian, cyclist, driver or passenger), and vehicle-to-infrastructure/network (V2I/N), covering LTE-based communication between a vehicle and a roadside unit (RSU)/network. A RSU is a transportation infrastructure entity (e.g. an entity transmitting speed notifications) implemented in an eNodeB (eNB) or a stationary UE.

SUMMARY OF THE INVENTION

The present invention provides a method and apparatus for authorizing a pedestrian user equipment (UE) in a wireless communication system. The present invention provides a S1 and X2 enhancement for vehicle UE and road side unit (RSU) UE, pedestrian UE authentication procedure.

In an aspect, a method for receiving authorization information for vehicle-to-everything (V2X) communication by an eNodeB (eNB) in a wireless communication system is provided. The method includes receiving authorization information for a pedestrian user equipment (UE) which indicates whether a UE is authorized as the pedestrian UE.

In another aspect, an eNodeB (eNB) in a wireless communication system is provided. The method includes a memory, and a processor, coupled to the memory, that receives authorization information for a pedestrian user equipment (UE) which indicates whether a UE is authorized as the pedestrian UE.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
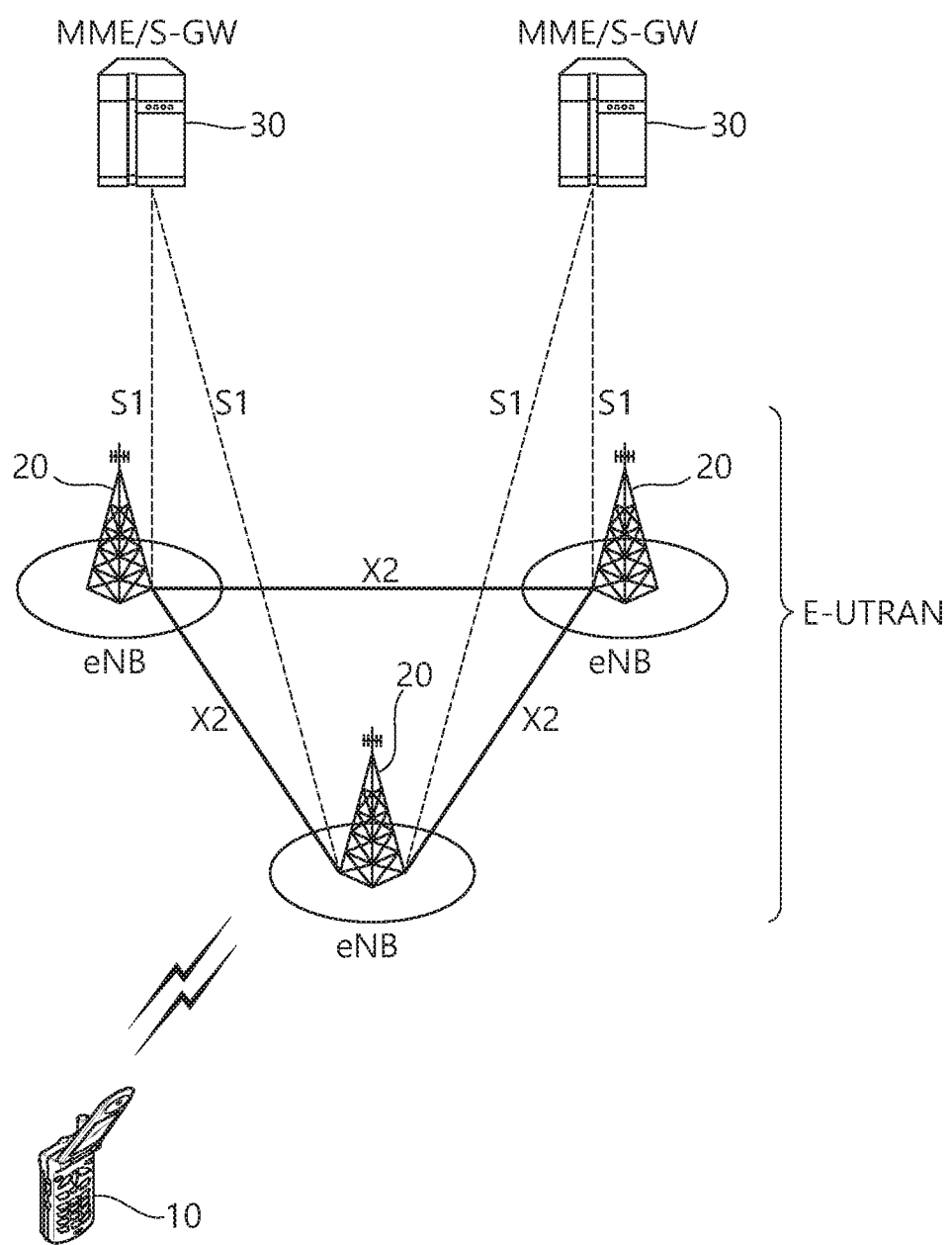
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a serving gateway (S-GW). The MME/S-GW 30 may be positioned at the end of the network. For clarity, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
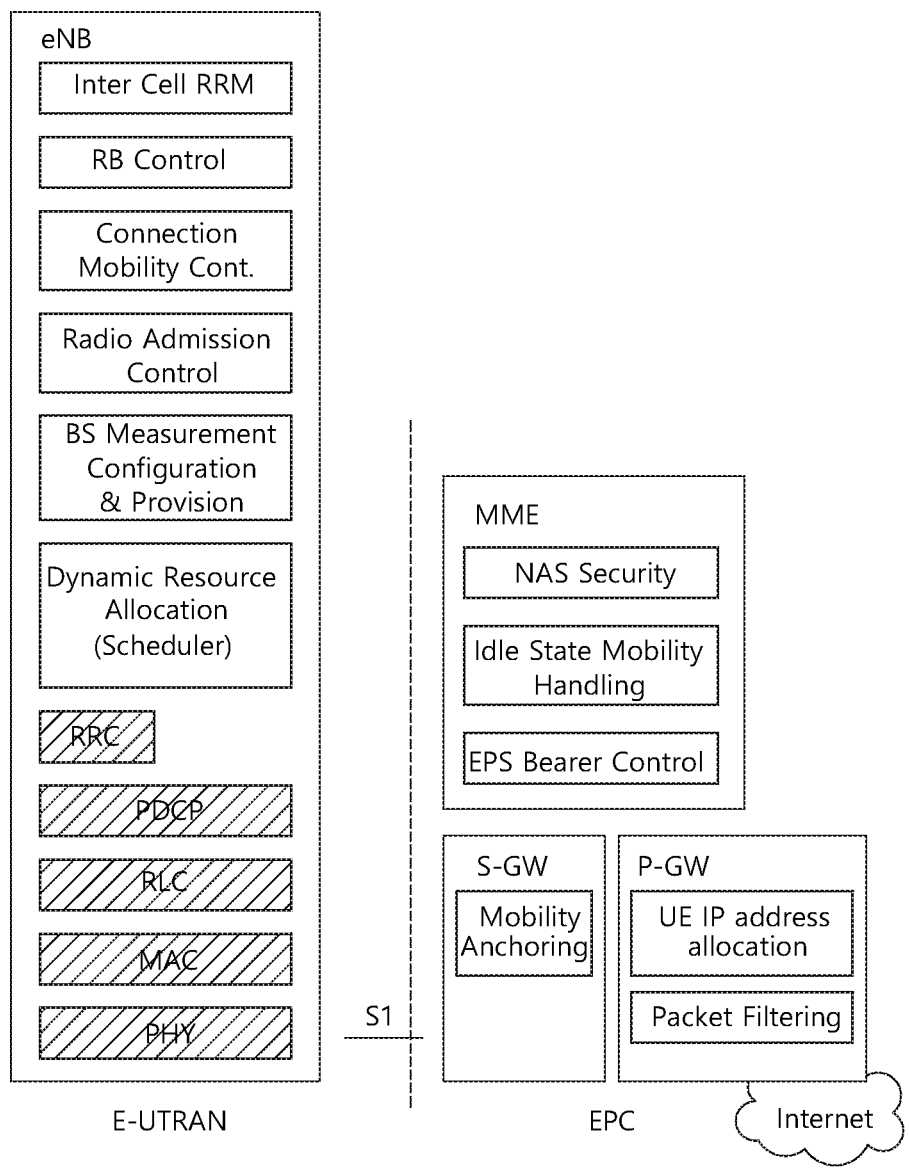
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
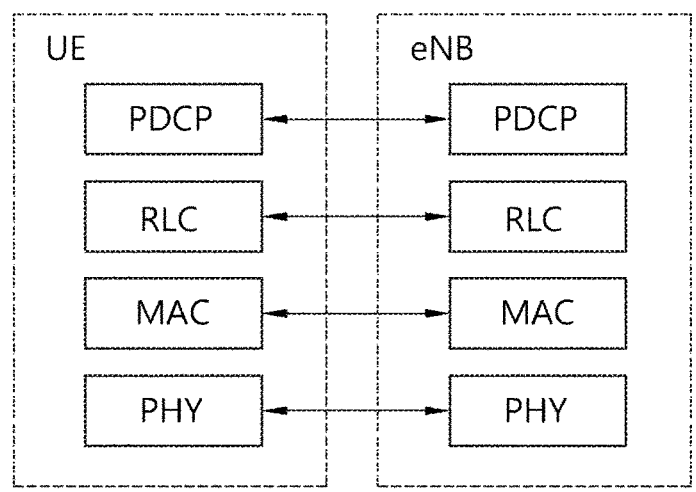
FIG. 3 shows a block diagram of a user plane protocol stack of an LTE system.
Figure 4:
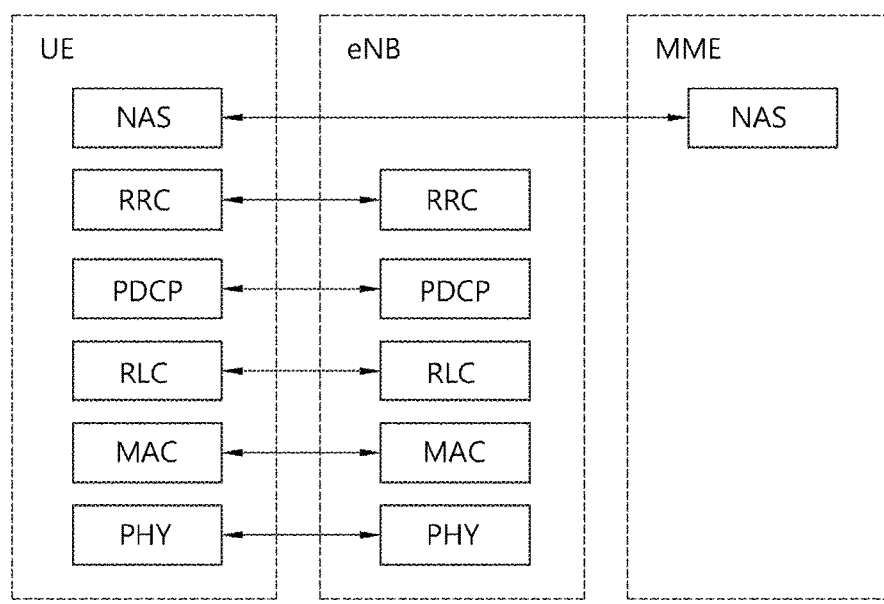
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
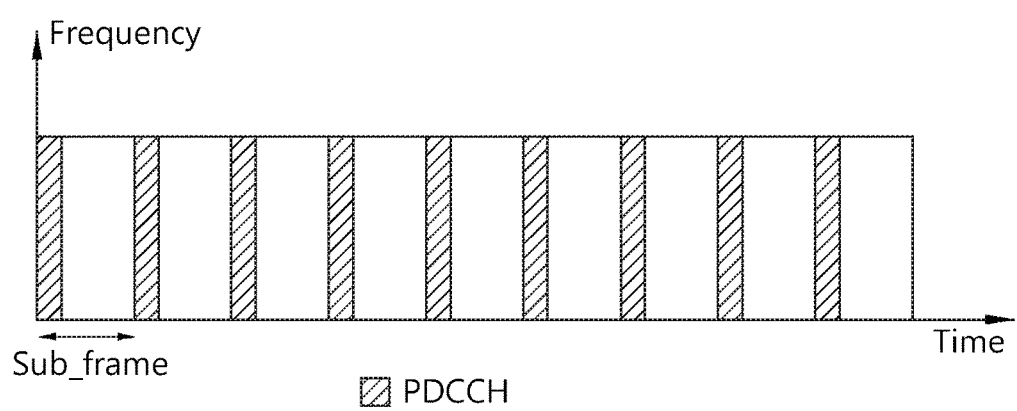
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, an uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Vehicle-to-everything (V2X) communication is described. V2X communication contains three different types, which are vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, roadside infrastructure, and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and V2N service. V2V service is a type of V2X service, where both parties of the communication are UEs using V2V application. V2I service is a type of V2X Service, where one party is a UE and the other party is a road side unit (RSU) both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X service, where one party is a UE and the other party is a serving entity, both using V2N applications and communicating with each other via LTE network entities.

For V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X Service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X service, e.g., RSU, application server, etc.

For V2I, the UE supporting V2I applications sends application layer information to RSU. RSU sends application layer information to a group of UEs or a UE supporting V2I applications. V2N is also introduced where one party is a UE and the other party is a serving entity, both supporting V2N applications and communicating with each other via LTE network.

For V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X Service. The UE supporting V2P applications transmits application layer information. Such information can be broadcast by a vehicle with UE supporting V2X service (e.g., warning to pedestrian), and/or by a pedestrian with UE supporting V2X service (e.g., warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

Figure 6:
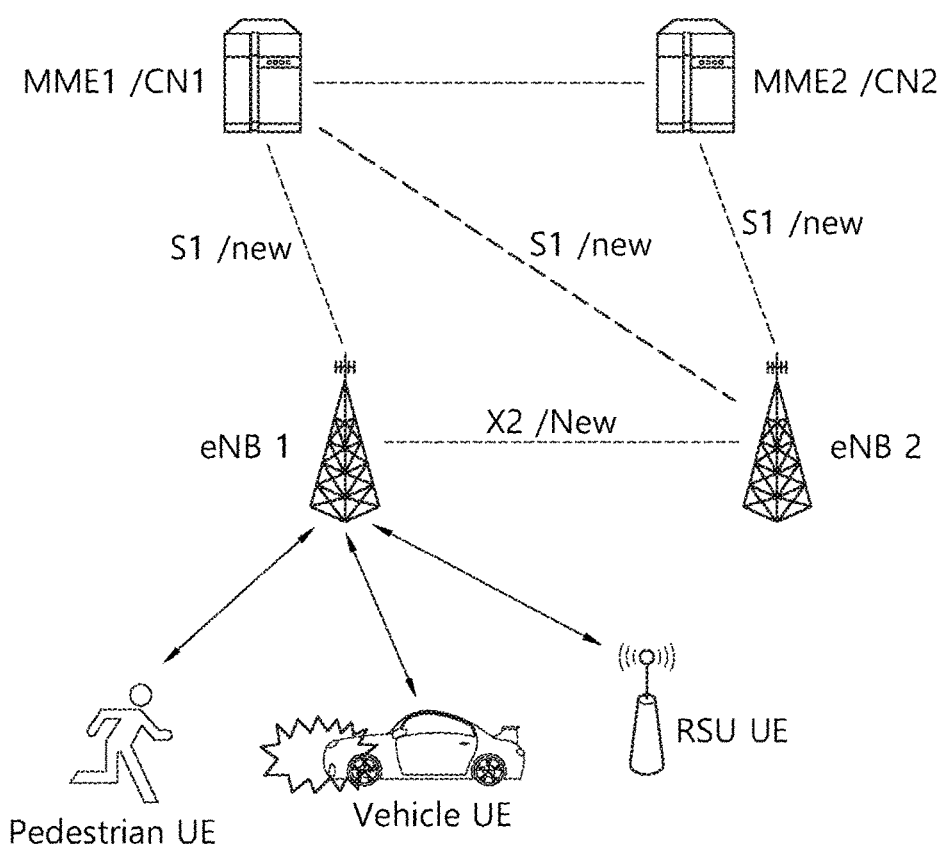
FIG. 6 shows an example of an architecture for V2X communication.

FIG. 6 shows an example of an architecture for V2X communication. Referring to FIG. 6, the existing node (i.e. eNB/MME) or new nodes may be deployed for supporting V2X communication. The interface between nodes may be S1/X2 interface or new interface. That is, the interface between eNB1 and eNB2 may be X2 interface or new interface. The interface between eNB1/eNB2 and MME1/MME2 may be S1 interface or new interface.

Further, there may be three types of UE for V2X communication, one of which is a vehicle UE, the second is a RSU UE, and the last is a pedestrian UE. The vehicle UE may be like the generic UE. The RSU UE is a RSU which is implemented in the UE, and can relay or multicast or broadcast the traffic or safety information or other vehicle UEs. The pedestrian UE is a UE supporting V2X communication which is carried by a pedestrian, cyclist, driver or passenger. For V2X communication, vehicle UEs and pedestrian UEs may be communicated with each other directly via PC5 interface. Alternatively, vehicle UEs and pedestrian UEs may be communicated with each other indirectly via the network node. The network node may be one of an eNB, a new entity for V2X communication, a new gateway for V2X communication, a RSU, etc. The network node may not be the MME or S-GW. Alternatively, a vehicle UE or a pedestrian UE may broadcast data, and the RSU UE may receive the broadcast data. The RSU and another vehicle UE/pedestrian UE may be communicated with each other indirectly via the network node. The network node may be one of an eNB, a new entity for V2X communication, a new gateway for V2X communication, a RSU, etc. In this case, the network node may not be the MME or S-GW.

Authorization is an issue to solve from eNB point of view. The eNB may have to decide how to handle the radio resource to the corresponding UE. More specifically, depending on the type of UEs supporting V2X communication, the eNB may allocate radio resource differently. For example, for pedestrian UE, the eNB may decide to use mode 4 sidelink transmission. In the mode 4 sidelink transmission, the pedestrian UE may perform partial sensing on a subset of subframes, not entire subframes. In this case, the pedestrian UE can apply partial sensing to save power. Accordingly, it may be required to solve the authentication problem for the vehicle UE, RSU UE and pedestrian UE. In addition, it may be required to solve the authentication problem at the target eNB side during mobility procedure.

Figure 7:
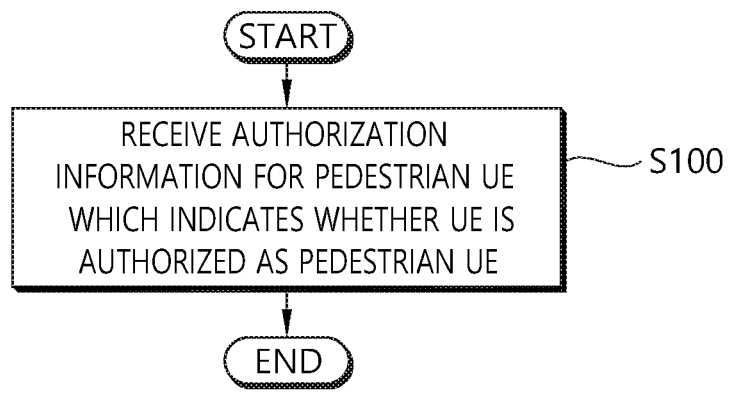
FIG. 7 shows a method for receiving authorization information for V2X communication according to an embodiment of the present invention.

FIG. 7 shows a method for receiving authorization information for V2X communication according to an embodiment of the present invention.

In step S100, the eNB receives authorization information for a pedestrian UE which indicates whether a UE is authorized as the pedestrian UE. The authorization information for the pedestrian UE may be "Pedestrian UE Authorized" information element (IE), which may be included in an existing message or a new message. The authorization information for the pedestrian UE (or "Pedestrian UE Authorized" IE) provides information on the authorization status of the UE as the pedestrian UE for V2X services. That is, the authorization information for the pedestrian UE indicates whether the UE is authorized as pedestrian UE or not. Table 1 shows an example of "Pedestrian UE Authorized" IE.

TABLE 1

| IE/Group Name | Presence | Range | IE type and reference | Semantics description |
|---|---|---|---|---|
| Pedestrian UE Authorized | O | | ENUMERATED (authorized, not authorized, . . .) | Indicates whether the UE is authorized for Pedestrian UE or not |

Referring to Table 1, "Pedestrian UE Authorized" IE indicates whether the UE is authorized for pedestrian UE or not.

Further, the UE may receive authorization information for the vehicle UE, together with the authorization information for the pedestrian UE. The authorization information for the vehicle UE may be "Vehicle UE Authorized" IE, which may be included in an existing message or a new message. The authorization information for the vehicle UE (or "Vehicle UE Authorized" IE) provides information on the authorization status of the UE as the vehicle UE for V2X services. That is, the authorization information for the vehicle UE indicates whether the UE is authorized as vehicle UE or not. Table 2 shows an example of "Vehicle UE Authorized" IE.

TABLE 2

| IE/Group Name | Presence | Range | IE type and reference | Semantics description |
|---|---|---|---|---|
| Vehicle UE Authorized | O | | ENUMERATED (authorized, not authorized, . . .) | Indicates whether the UE is authorized for Vehicle UE or not |

Referring to Table 2, "Vehicle UE Authorized" IE indicates whether the UE is authorized for vehicle UE or not.

Further, the UE may receive authorization information for the RSU UE, together with the authorization information for the pedestrian UE/vehicle UE. The authorization information for the RSU UE may be "RSU UE Authorized" IE, which may be included in an existing message or a new message. The authorization information for the RSU UE (or "RSU UE Authorized" IE) provides information on the authorization status of the UE as the RSU UE for V2X services. That is, the authorization information for the RSU UE indicates whether the UE is authorized as RSU UE or not. Table 3 shows an example of "RSU UE Authorized" IE.

TABLE 3

| IE/Group Name | Presence | Range | IE type and reference | Semantics description |
|---|---|---|---|---|
| RSU UE Authorized | O | | ENUMERATED (authorized, not authorized, . . .) | Indicates whether the UE is authorized for RSU UE or not |

Referring to Table 3, "RSU UE Authorized" IE indicates whether the UE is authorized for vehicle UE or not.

Upon receiving the authorization information for at least one of pedestrian UE, vehicle UE or RSU UE, the eNB may authorize the UE as the pedestrian UE or not according to the received authorization information. If the UE is authorized as the pedestrian UE, the eNB may update authorization of the UE for a V2X service as the pedestrian UE. If the UE is not authorized as the pedestrian UE, the eNB may initiate actions to ensure that the UE is no longer accessing a V2X service as the pedestrian UE.

The authorization information for at least one of pedestrian UE, vehicle UE or RSU UE may be received during initial attach/service request stage or during the MME triggered UE context modification procedure. In this case, the authorization information for at least one of pedestrian UE, vehicle UE or RSU UE may be received from the MME. For example, the authorization information for at least one of pedestrian UE, vehicle UE or RSU UE may be received during an initial context setup procedure in such as attach, service request, etc., via an initial context setup request message. Alternatively, the authorization information for at least one of pedestrian UE, vehicle UE or RSU UE may be received via a UE context modification request message.

Alternatively, the authorization information for at least one of pedestrian UE, vehicle UE or RSU UE may be received during mobility procedure. For X2 handover procedure, the authorization information for at least one of pedestrian UE, vehicle UE or RSU UE may be received from the source eNB via the handover request message. Further, the authorization information for at least one of pedestrian UE, vehicle UE or RSU UE may be updated and received from the MME via a path switch request acknowledge message. For S1 handover procedure, authorization information for at least one of pedestrian UE, vehicle UE or RSU UE may be received from the MME via the handover request message.

Hereinafter, various embodiments of the present invention for receiving the authorization information for at least one of pedestrian UE, vehicle UE or RSU UE and using the received authorization information are described.

Figure 8:
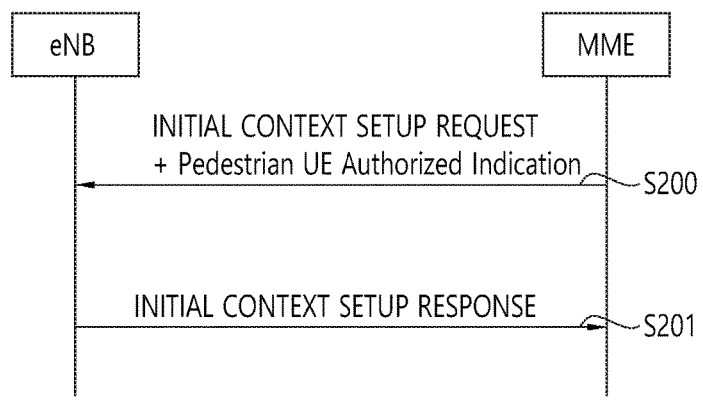
FIG. 8 shows a method for receiving authorization information for V2X communication according to another embodiment of the present invention.

FIG. 8 shows a method for receiving authorization information for V2X communication according to another embodiment of the present invention. This embodiment corresponds authentication during initial attach/service request, specifically the procedure involving the initial context setup procedure in such as attach, service request, etc.

In step S200, the eNB receives an initial context setup request message from the MME. The initial context setup request message is sent by the MME to request the setup of a UE context. The initial context setup request message may include the authorization information for the pedestrian UE, i.e. "Pedestrian UE Authorized" IE. Further, even though not described, the initial context setup request message may include at least one of the authorization information for the vehicle UE, i.e. "Vehicle UE Authorized" IE, or the authorization information for the RSU UE, i.e. "RSU UE Authorized" IE. Table 4 shows an example of the initial context setup request message according to an embodiment of the present invention.

TABLE 4

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | M | | 9.2.1.20 | | YES | reject |
| E-RAB to Be Setup List | | 1 | | | YES | reject |
| >E-RAB to Be Setup Item IEs | | 1 . . . <maxnoofE-RABs> | | | EACH | reject |
| >>E-RAB ID | M | | 9.2.1.2 | | — | — |
| >>E-RAB Level | M | | 9.2.1.15 | Includes | — | — |

TABLE 4-continued

| IE/Group Name | Presence | Range | IE type and reference | Semantics description | Criticality | Assigned Criticality |
|---|---|---|---|---|---|---|
| QoS Parameters | | | | necessary QoS parameters. | | |
| >>Transport Layer Address | M | | 9.2.2.1 | | — | |
| >>GTP-TEID | M | | 9.2.2.2 | | — | |
| >>NAS-PDU | O | | 9.2.3.5 | | — | |
| >>Correlation ID | O | | 9.2.1.80 | | YES | ignore |
| >>SIPTO Correlation ID | O | | Correlation ID 9.2.1.80 | | YES | ignore |
| UE Security Capabilities | M | | 9.2.1.40 | | YES | reject |
| Security Key | M | | 9.2.1.41 | The KeNB is provided after the key-generation in the MME, see TS 33.401 [15]. | YES | reject |
| Trace Activation | O | | 9.2.1.4 | | YES | ignore |
| Handover Restriction List | O | | 9.2.1.22 | | YES | ignore |
| UE Radio Capability | O | | 9.2.1.27 | | YES | ignore |
| Subscriber Profile ID for RAT/Frequency priority | O | | 9.2.1.39 | | YES | ignore |
| CS Fallback Indicator | O | | 9.2.3.21 | | YES | reject |
| SRVCC Operation Possible | O | | 9.2.1.58 | | YES | ignore |
| CSG Membership Status | O | | 9.2.1.73 | | YES | ignore |
| Registered LAI | O | | 9.2.3.1 | | YES | ignore |
| GUMMEI | O | | 9.2.3.9 | This IE indicates the MME serving the UE. | YES | ignore |
| MME UE S1AP ID 2 | O | | 9.2.3.3 | This IE indicates the MME UE S1AP ID assigned by the MME. | YES | ignore |
| Management Based MDT Allowed | O | | 9.2.1.83 | | YES | ignore |
| Management Based MDT PLMN List | O | | MDT PLMN List 9.2.1.89 | | YES | ignore |
| Additional CS Fallback Indicator | C-ifCSFBhighpriority | | 9.2.3.37 | | YES | ignore |
| Masked IMEISV | O | | 9.2.3.38 | | YES | ignore |
| Expected UE Behaviour | O | | 9.2.1.96 | | YES | ignore |
| ProSe Authorized | O | | 9.2.1.99 | | YES | ignore |
| Vehicle UE Authorized | O | | 9.2.1.XX | | YES | ignore |
| RSU UE Authorized | O | | 9.2.1.XX | | YES | ignore |
| Pedestrian UE Authorized | O | | 9.2.1.XX | | YES | ignore |

Referring to Table 4, the initial context setup request message may include at least one of "Pedestrian UE Authorized" IE, shown in Table 1 above, "Vehicle UE Authorized" IE, shown in Table 2 above, or "RSU UE Authorized" IE, shown in Table 3 above.

Upon receipt of the initial context setup request message including at least one "Pedestrian UE Authorized" IE, "Vehicle UE Authorized" IE or "RSU UE Authorized" IE, the eNB may store the received authorization information, if supported, in the UE context. The eNB may validate whether the UE is authorized as pedestrian UE, vehicle UE, or RSU UE for V2X communication transmission by using the UE context. In step S201, the eNB transmits an initial context setup response message to the MME.

Figure 9:
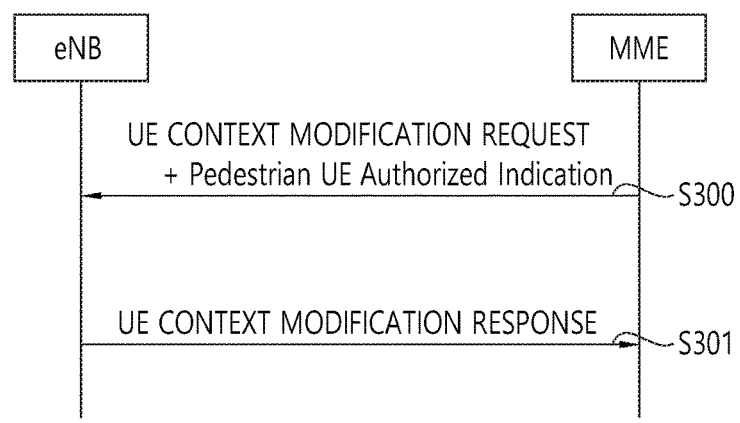
FIG. 9 shows a method for receiving authorization information for V2X communication according to another embodiment of the present invention.

FIG. 9 shows a method for receiving authorization information for V2X communication according to another embodiment of the present invention. This embodiment corresponds to authentication during the MME triggered UE context modification procedure.

In step S300, the eNB receives a UE context modification request message from the MME. The UE context modification request message is sent by the MME to provide UE context information changes to the eNB. The UE context modification request message may include the authorization information for the pedestrian UE, i.e. "Pedestrian UE Authorized" IE. Further, even though not described, the UE context modification request message may include at least one of the authorization information for the vehicle UE, i.e. "Vehicle UE Authorized" IE, or the authorization information for the RSU UE, i.e. "RSU UE Authorized" IE. Table 5 shows an example of the UE context modification request message according to an embodiment of the present invention.

If "Pedestrian UE Authorized" IE, "Vehicle UE Authorized" IE or "RSU UE Authorized" IE is contained in the UE context modification request message, the eNB may, if supported, update its authorization information for the corresponding UE accordingly. If "Pedestrian UE Authorized" IE, "Vehicle UE Authorized" IE or "RSU UE Authorized" IE is set to "not authorized", the eNB may, if supported, initiate actions to ensure that the corresponding UE is no longer accessing the relevant V2X services. In step S301, the eNB transmits an UE context modification response message to the MME.

Figure 10:
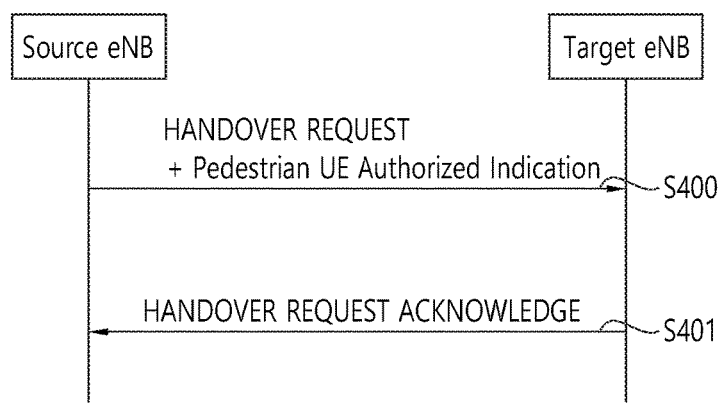
FIG. 10 shows a method for receiving authorization information for V2X communication according to another embodiment of the present invention.

FIG. 10 shows a method for receiving authorization information for V2X communication according to another embodiment of the present invention. This embodiment corresponds to authentication during mobility procedure, specifically X2 handover procedure.

In step S400, the target eNB receives a handover request message from the source eNB. The handover request message is sent by the source eNB to the target eNB to request the preparation of resources for a handover. The handover request message may include the authorization information for the pedestrian UE, i.e. "Pedestrian UE Authorized" IE. Further, even though not described, the UE context modification request message may include at least one of the

TABLE 5

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| Security Key | O | | 9.2.1.41 | A fresh KeNB is provided after performing a key-change on the fly procedure in the MME, see TS 33.401 [15]. | YES | reject |
| Subscriber Profile ID for RAT/Frequency priority | O | | 9.2.1.39 | | YES | ignore |
| UE Aggregate Maximum Bit Rate | O | | 9.2.1.20 | | YES | ignore |
| CS Fallback Indicator | O | | 9.2.3.21 | | YES | reject |
| UE Security Capabilities | O | | 9.2.1.40 | | YES | reject |
| CSG Membership Status | O | | 9.2.1.73 | | YES | ignore |
| Registered LAI | O | | 9.2.3.1 | | YES | ignore |
| Additional CS Fallback Indicator | C-ifCSFBhighpriority | | 9.2.3.37 | | YES | ignore |
| ProSe Authorized | O | | 9.2.1.99 | | YES | ignore |
| Vehicle UE Authorized | O | | 9.2.1.XX | | YES | ignore |
| RSU UE Authorized | O | | 9.2.1.XX | | YES | ignore |
| Pedestrian UE Authorized | O | | 9.2.1.XX | | YES | ignore |

Referring to Table 5, the UE context modification request message may include at least one of "Pedestrian UE Authorized" IE, shown in Table 1 above, "Vehicle UE Authorized" IE, shown in Table 2 above, or "RSU UE Authorized" IE, shown in Table 3 above.

authorization information for the vehicle UE, i.e. "Vehicle UE Authorized" IE, or the authorization information for the RSU UE, i.e. "RSU UE Authorized" IE. Table 6 shows an example of the handover request message according to an embodiment of the present invention.

TABLE 6

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | reject |
| Cause | M | | 9.2.6 | | YES | ignore |
| Target Cell ID | M | | ECGI 9.2.14 | | YES | reject |
| GUMMEI | M | | 9.2.16 | | YES | reject |
| UE Context Information | | 1 | | | YES | reject |
| >MME UE S1AP ID | M | | INTEGER $(0 \ldots 2^{32} -1)$ | MME UE S1AP ID allocated at the MME | — | — |
| >UE Security Capabilities | M | | 9.2.29 | | — | — |
| >AS Security Information | M | | 9.2.30 | | — | — |
| >UE Aggregate Maximum Bit Rate | M | | 9.2.12 | | — | — |
| >Subscriber Profile ID for RAT/Frequency priority | O | | 9.2.25 | | — | — |
| >E-RABs To Be Setup List | | 1 | | | — | — |
| >>E-RABs To Be Setup Item | | 1 . . . <maxnoofBearers> | | | EACH | ignore |
| >>>E-RAB ID | M | | 9.2.23 | | — | — |
| >>>E-RAB Level QoS Parameters | M | | 9.2.9 | Includes necessary QoS parameters | — | — |
| >>>DL Forwarding | O | | 9.2.5 | | — | — |
| >>>UL GTP Tunnel Endpoint | M | | GTP Tunnel Endpoint 9.2.1 | SGW endpoint of the S1 transport bearer. For delivery of UL PDUs. | — | — |
| >RRC Context | M | | OCTET STRING | Includes the RRC Handover Preparation Information message as defined in subclause 10.2.2 of TS 36.331 [9] | — | — |
| >Handover Restriction List | O | | 9.2.3 | | — | — |
| >Location Reporting Information | O | | 9.2.21 | Includes the necessary parameters for location reporting | — | — |
| >Management Based MDT Allowed | O | | 9.2.59 | | YES | ignore |
| >Management Based MDT PLMN List | O | | MDT PLMN List 9.2.64 | | YES | ignore |
| UE History Information | M | | 9.2.38 | Same definition as in TS 36.413 [4] | YES | ignore |
| Trace Activation | O | | 9.2.2 | | YES | ignore |
| SRVCC Operation Possible | O | | 9.2.33 | | YES | ignore |
| CSG Membership Status | O | | 9.2.52 | | YES | reject |

TABLE 6-continued

| IE/Group Name | Presence | Range | IE type and reference | Semantics description | Criticality | Assigned Criticality |
|---|---|---|---|---|---|---|
| Mobility Information | O | | BIT STRING (SIZE (32)) | Information related to the handover; the source eNB provides it in order to enable later analysis of the conditions that led to a wrong HO. | YES | ignore |
| Masked IMEISV | O | | 9.2.69 | | YES | ignore |
| UE History Information from the UE | O | | OCTET STRING | VisitedCellInfo List contained in the UEInformation Response message (TS 36.331 [9]) | YES | ignore |
| Expected UE Behaviour | O | | 9.2.70 | | YES | ignore |
| ProSe Authorized | O | | 9.2.78 | | YES | ignore |
| Vehicle UE Authorized | O | | 9.2.XX | | YES | ignore |
| RSU UE Authorized | O | | 9.2.XX | | YES | ignore |
| Pedestrian UE Authorized | O | | 9.2.1.XX | | YES | ignore |

Referring to Table 6, the handover request message may include at least one of "Pedestrian UE Authorized" IE, shown in Table 1 above, "Vehicle UE Authorized" IE, shown in Table 2 above, or "RSU UE Authorized" IE, shown in Table 3 above.

If "Pedestrian UE Authorized", "Vehicle UE Authorized" IE or "RSU UE Authorized" IE is contained in the handover request message, and it contains one or more IEs set to "authorized", the target eNB may, if supported, consider that the corresponding UE is authorized for the relevant V2X services. In step S401, the target eNB transmits a handover request acknowledge message to the source eNB.

Figure 11:
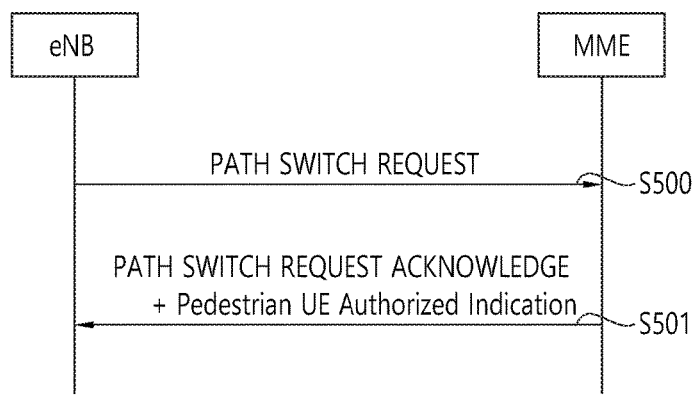
FIG. 11 shows a method for receiving authorization information for V2X communication according to another embodiment of the present invention.

FIG. 11 shows a method for receiving authorization information for V2X communication according to another embodiment of the present invention. During the X2 handover procedure, the authorization information for pedestrian UE, vehicle UE or RSU UE may be updated in some case. This embodiment corresponds to update of authentication during mobility procedure, specifically X2 handover procedure.

In step S500, the eNB transmits a path switch request message to the MME. In step S501, the eNB receives a path switch request acknowledge message from the MME. The path switch request acknowledge message is sent by the MME to inform the eNB that the path switch has been successfully completed in the EPC. The path switch request acknowledge message may include the authorization information for the pedestrian UE, i.e. "Pedestrian UE Authorized" IE. Further, even though not described, the path switch request acknowledge message may include at least one of the authorization information for the vehicle UE, i.e. "Vehicle UE Authorized" IE, or the authorization information for the RSU UE, i.e. "RSU UE Authorized" IE. Table 7 shows an example of the handover request message according to an embodiment of the present invention.

TABLE 7

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | ignore |
| eNB UE S1AP ID | M | | 9.2.3.4 | | YES | ignore |
| UE Aggregate Maximum Bit Rate | O | | 9.2.1.20 | | YES | ignore |
| E-RAB To Be Switched in Uplink List | | 0 . . . 1 | | | YES | ignore |
| >E-RABs Switched in Uplink Item IEs | | 1 . . . <maxnoofE-RABs> | | | EACH | ignore |
| >>E-RAB ID | M | | 9.2.1.2 | | — | |
| >>Transport Layer Address | M | | 9.2.2.1 | | — | |
| >>GTP-TEID | M | | 9.2.2.2 | | — | |
| E-RAB To Be | O | | E-RAB | A value for | YES | ignore |

TABLE 7-continued

| IE/Group Name | Presence | Range | IE type and reference | Semantics description | Criticality | Assigned Criticality |
|---|---|---|---|---|---|---|
| Released List | | | List 9.2.1.36 | E-RAB ID shall only be present once in E-RAB To Be Switched in Uplink List IE and E-RAB to Be Released List IE. | | |
| Security Context | M | | 9.2.1.26 | One pair of {NCC, NH} is provided. | YES | reject |
| Criticality Diagnostics | O | | 9.2.1.21 | | YES | ignore |
| MME UE S1AP ID 2 | O | | 9.2.3.3 | This IE indicates the MME UE S1AP ID assigned by the MME. | YES | ignore |
| CSG Membership Status | O | | 9.2.1.73 | | YES | ignore |
| ProSe Authorized | O | | 9.2.1.99 | | YES | ignore |
| Vehicle UE Authorized | O | | 9.2.1.XX | | YES | ignore |
| RSU UE Authorized | O | | 9.2.1.XX | | YES | ignore |
| Pedestrian UE Authorized | O | | 9.2.1.XX | | YES | ignore |

Referring to Table 7, the path switch request acknowledge message may include at least one of "Pedestrian UE Authorized" IE, shown in Table 1 above, "Vehicle UE Authorized" IE, shown in Table 2 above, or "RSU UE Authorized" IE, shown in Table 3 above.

If "Pedestrian UE Authorized", "Vehicle UE Authorized" IE or "RSU UE Authorized" IE is contained in the path switch request acknowledge message, the eNB may, if supported, update its authorization information for the corresponding UE accordingly. If "Pedestrian UE Authorized", "Vehicle UE Authorized" IE or "RSU UE Authorized" IE is set to "not authorized", the eNB may, if supported, initiate actions to ensure that the corresponding UE is no longer accessing the relevant V2X services.

Figure 12:
FIG. 12 shows a method for receiving authorization information for V2X communication according to another embodiment of the present invention.

FIG. 12 shows a method for receiving authorization information for V2X communication according to another embodiment of the present invention. This embodiment corresponds to authentication during mobility procedure, specifically S1 handover procedure.

In step S600, the target eNB receives a handover request message from the MME. The handover request message is sent by the MME to the target eNB to request the preparation of resources. The handover request message may include the authorization information for the pedestrian UE, i.e. "Pedestrian UE Authorized" IE. Further, even though not described, the UE context modification request message may include at least one of the authorization information for the vehicle UE, i.e. "Vehicle UE Authorized" IE, or the authorization information for the RSU UE, i.e. "RSU UE Authorized" IE. Table 8 shows an example of the handover request message according to an embodiment of the present invention.

TABLE 8

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| Handover Type | M | | 9.2.1.13 | | YES | reject |
| Cause | M | | 9.2.1.3 | | YES | ignore |
| UE Aggregate Maximum Bit Rate | M | | 9.2.1.20 | | YES | reject |
| E-RABs To Be Setup List | | 1 | | | YES | reject |
| >E-RABs To Be Setup Item IEs | | 1 . . . <maxnoofE-RABs> | | | EACH | reject |
| >>E-RAB ID | M | | 9.2.1.2 | | — | |
| >>Transport Layer Address | M | | 9.2.2.1 | | — | |
| >>GTP-TEID | M | | 9.2.2.2 | To deliver UL PDUs. | — | |

TABLE 8-continued

| IE/Group Name | Presence | Range | IE type and reference | Semantics description | Criticality | Assigned Criticality |
|---|---|---|---|---|---|---|
| >>E-RAB Level QoS Parameters | M | | 9.2.1.15 | Includes necessary QoS parameters. | — | |
| >>Data Forwarding Not Possible | O | | 9.2.1.76 | | YES | ignore |
| Source to Target Transparent Container | M | | 9.2.1.56 | | YES | reject |
| UE Security Capabilities | M | | 9.2.1.40 | | YES | reject |
| Handover Restriction List | O | | 9.2.1.22 | | YES | ignore |
| Trace Activation | O | | 9.2.1.4 | | YES | ignore |
| Request Type | O | | 9.2.1.34 | | YES | ignore |
| SRVCC Operation Possible | O | | 9.2.1.58 | | YES | ignore |
| Security Context | M | | 9.2.1.26 | | YES | reject |
| NAS Security Parameters to E-UTRAN | C-iffrom UTRANGERAN | | 9.2.3.31 | The eNB shall use this IE as specified in TS 33.401 [15]. | YES | reject |
| CSG Id | O | | 9.2.1.62 | | YES | reject |
| CSG Membership Status | O | | 9.2.1.73 | | YES | ignore |
| GUMMEI | O | | 9.2.3.9 | This IE indicates the MME serving the UE. | YES | ignore |
| MME UE S1AP ID 2 | O | | 9.2.3.3 | This IE indicates the MME UE S1AP ID assigned by the MME. | YES | ignore |
| Management Based MDT Allowed | O | | 9.2.1.83 | | YES | ignore |
| Management Based MDT PLMN List | O | | MDT PLMN List 9.2.1.89 | | YES | ignore |
| Masked IMEISV | O | | 9.2.3.38 | | YES | ignore |
| Expected UE Behaviour | O | | 9.2.1.96 | | YES | ignore |
| ProSe Authorized | O | | 9.2.1.99 | | YES | ignore |
| Vehicle UE Authorized | O | | 9.2.1.XX | | YES | ignore |
| RSU UE Authorized | O | | 9.2.1.XX | | YES | ignore |
| Pedestrian UE Authorized | O | | 9.2.1.XX | | YES | ignore |

Referring to Table 8, the handover request message may include at least one of "Pedestrian UE Authorized" IE, shown in Table 1 above, "Vehicle UE Authorized" IE, shown in Table 2 above, or "RSU UE Authorized" IE, shown in Table 3 above.

If "Pedestrian UE Authorized" IE, "Vehicle UE Authorized" IE or "RSU UE Authorized" IE is contained in the handover request message, and it contains one or more IEs set to "authorized", the target eNB may, if supported, consider that the corresponding UE is authorized for the relevant V2X services. In step S601, the target eNB transmits a handover request acknowledge message to the MME.

Figure 13:
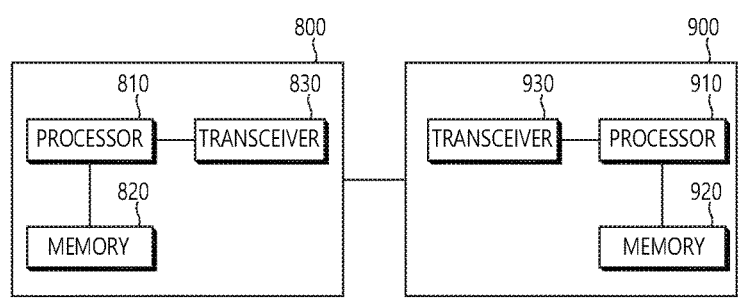
FIG. 13 shows a communication system to implement an embodiment of the present invention.

FIG. 13 shows a communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A MME or another eNB 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, a pedestrian UE can be authorized efficiently.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for receiving authorization information for vehicle-to-everything (V2X) communication by an eNodeB (eNB) in a wireless communication system, the method comprising:
   receiving, by the eNB from a mobility management entity (MME) via a UE context modification request message or a path switch request acknowledge message, pedestrian user equipment (UE) authorization information for a pedestrian user equipment (UE) which indicates whether or not a UE, connected to the eNB, is authorized as a pedestrian UE;
   updating, by the eNB, V2X services authorization information for the UE by using the pedestrian UE authorization information; and
   if the pedestrian UE authorization information indicates that the UE is not authorized as the pedestrian UE, initiating, by the eNB, actions to ensure that the UE is no longer accessing V2X services as the pedestrian UE.

2. The method of claim 1, wherein the UE context modification request message or the path switch request acknowledge message further includes vehicle UE authorization information which indicates whether the UE is authorized as a vehicle UE.

3. The method of claim 1, wherein the UE context modification request message or the path switch request acknowledge message further includes road side unit (RSU) UE authorization information which indicates whether the UE is authorized as a RSU UE.

4. The method of claim 1, further comprising:
   allocating, by the eNB, a radio resource to the UE as the pedestrian UE, if the pedestrian UE authorization information indicates that the UE is authorized as the pedestrian UE.

5. The method of claim 1, wherein the pedestrian UE authorization information is included as a Pedestrian UE Authorized information element (IE) in the UE context modification request message or the path switch request acknowledge message.

6. The method of claim 1, wherein the actions to ensure that the UE is no longer accessing V2X services as the pedestrian UE comprise:
   terminating any access to V2X services as the pedestrian UE if the pedestrian UE authorization information indicates that the UE is not authorized as the pedestrian UE.

7. An eNodeB (eNB) in a wireless communication system, the eNB comprising:
   a memory; and
   a processor, coupled to the memory, that:
      receives, from a mobility management entity (MME) via a UE context modification request message or a path switch request acknowledge message, pedestrian user equipment (UE) authorization information which indicates whether a UE, connected to the eNB, is authorized as a pedestrian UE or not;
      updates V2X services authorization information for the UE by using the pedestrian UE authorization information; and
      if the pedestrian UE authorization information indicates that the UE is not authorized as the pedestrian UE, initiates actions to ensure that the UE is no longer accessing V2X services as the pedestrian UE.

8. The eNB of claim 7, wherein the UE context modification request message or the path switch request acknowledge message further includes vehicle UE authorization information which indicates whether the UE is authorized as a vehicle UE.

9. The eNB of claim 7, wherein the UE context modification request message or the path switch request acknowledge message further includes road side unit (RSU) UE authorization information which indicates whether the UE is authorized as a RSU UE.

10. The eNB of claim 7, wherein the processor further allocates a radio resource to the UE as the pedestrian UE, if the pedestrian UE authorization information indicates that the UE is authorized as the pedestrian UE.

11. The eNB of claim 7, wherein the pedestrian UE authorization information is included as a Pedestrian UE Authorized information element (IE) in the UE context modification request message or the path switch request acknowledge message.

12. The eNB of claim 7, wherein the actions to ensure that the UE is no longer accessing V2X services as the pedestrian UE comprise:
   terminating any access to V2X services as the pedestrian UE if the pedestrian UE authorization information indicates that the UE is not authorized as the pedestrian UE.

* * * * *